United States Patent
Aggarwal et al.

(10) Patent No.: US 11,687,714 B2
(45) Date of Patent: Jun. 27, 2023

(54) SYSTEMS AND METHODS FOR GENERATING TEXT DESCRIPTIVE OF DIGITAL IMAGES

(71) Applicants: Adobe Inc., San Jose, CA (US); Pranav Aggarwal, San Jose, CA (US); Di Pu, Bothell, WA (US); Daniel ReMine, Seattle, WA (US); Ajinkya Kale, San Jose, CA (US)

(72) Inventors: Pranav Aggarwal, San Jose, CA (US); Di Pu, Bothell, WA (US); Daniel ReMine, Seattle, WA (US); Ajinkya Kale, San Jose, CA (US)

(73) Assignee: Adobe Inc., San Jose, CA (US)

(*) Notice: Subject to any disclaimer, the term of this patent is extended or adjusted under 35 U.S.C. 154(b) by 380 days.

(21) Appl. No.: 16/998,730

(22) Filed: Aug. 20, 2020

(65) Prior Publication Data
US 2022/0058340 A1    Feb. 24, 2022

(51) Int. Cl.
    G06F 40/279    (2020.01)

(52) U.S. Cl.
    CPC ................. *G06F 40/279* (2020.01)

(58) Field of Classification Search
    CPC ..... G06F 40/279; G06F 40/30; G06N 3/0454; G06N 3/08
    See application file for complete search history.

(56) References Cited

U.S. PATENT DOCUMENTS

| | | | | |
|---|---|---|---|---|
| 10,795,944 | B2* | 10/2020 | Brown | G06F 40/242 |
| 2013/0010062 | A1* | 1/2013 | Redmann | H04N 5/278 |
| | | | | 348/E13.064 |
| 2013/0339437 | A1* | 12/2013 | De Armas | G06F 3/0484 |
| | | | | 709/204 |
| 2013/0339907 | A1* | 12/2013 | Matas | G06F 3/04845 |
| | | | | 715/853 |
| 2016/0189414 | A1* | 6/2016 | Baker | G06F 16/58 |
| | | | | 704/9 |
| 2017/0061250 | A1* | 3/2017 | Gao | G06N 3/045 |
| 2017/0200066 | A1* | 7/2017 | Wang | G06F 16/5846 |
| 2018/0329892 | A1* | 11/2018 | Lubbers | G06V 20/20 |
| 2018/0373979 | A1* | 12/2018 | Wang | G06V 10/82 |
| 2019/0130221 | A1* | 5/2019 | Bose | G06V 30/274 |
| 2019/0286931 | A1* | 9/2019 | Kim | G06F 40/169 |
| 2019/0325023 | A1* | 10/2019 | Awadallah | G06F 40/51 |
| 2019/0379943 | A1* | 12/2019 | Ayala | H04N 21/4884 |
| 2020/0117951 | A1* | 4/2020 | Li | G06F 18/214 |
| 2022/0058340 | A1* | 2/2022 | Aggarwal | G06N 3/045 |

* cited by examiner

*Primary Examiner* — Akwasi M Sarpong
(74) *Attorney, Agent, or Firm* — FIG. 1 Patents

(57) ABSTRACT

Disclosed are computer-implemented methods and systems for generating text descriptive of digital images, comprising using a machine learning model to pre-process an image to generate initial text descriptive of the image; adjusting one or more inferences of the machine learning model, the inferences biasing the machine learning model away from associating negative words with the image; using the machine learning model comprising the adjusted inferences to post-process the image to generate updated text descriptive of the image; and processing the generated updated text descriptive of the image outputted by the machine learning model to fine-tune the updated text descriptive of the image.

20 Claims, 10 Drawing Sheets

SYSTEMS AND METHODS FOR GENERATING TEXT DESCRIPTIVE OF DIGITAL IMAGES

TECHNICAL FIELD

The present disclosure relates to the field of generating captions for digital images and, more particularly, to systems and methods for generating text descriptive of digital images using machine learning and post-processing rules.

BACKGROUND

Recent years have seen a significant increase in the use of digital images and videos by individuals and businesses. Whether for entertainment, advertising, educational, or other purposes, individuals and businesses increasingly generate and utilize digital images. For example, in today's technological environment, an individual captures and shares digital images with friends over a social network, receive digital image advertisements, or review digital images as part of reading digital news.

As the prevalence of digital images and videos has increased, the need for digital image captioning has also increased. Digital image captioning is the process of generating a natural language description for a digital image. Digital image captioning is used in a variety of applications to provide an indication of content of one or more digital images. For example, image captioning can help visually impaired individuals understand the content of a digital image where they are unable to see the digital image. Similarly, image captioning can assist in identifying, labeling, or searching for digital images.

To address this need, developers have created systems that automatically generate captions describing the contents of digital images. For example, some conventional systems utilize deep learning techniques that directly "translate" an image into a caption. Such conventional systems, however, have a number of significant shortcomings. For example, conventional systems utilizing deep learning techniques often require an enormous amount of training data. In particular, to learn to convert unseen images into new captions, conventional captioning systems can require large volumes of training images where each training image has a corresponding description. Such large volumes of training data are difficult and expensive to obtain.

Moreover, conventional systems continue to caption new images with insufficient accuracy. For example, as with any other machine learning model, image captioning models generally perform only as well as the training data it sees. The model's ability to predict concepts is often limited by the finite vocabulary it is exposed to during training. As a result, when dealing with visually similar but conceptually different images, biases are introduced causing the model to underperform. To illustrate, if the model has been exposed to a limited number of city skyline images (e.g., say London and Shanghai skylines), a new image of New York or Seattle skylines will force the model to predict London or Shanghai skyline captions since the model does not yet have New York or Seattle in its vocabulary. Moreover, machine-generated image captions often include offensive or negative words, or include inaccurate information about a person's gender or a geolocation associated with a captured image. Such inaccurate and/or offensive titles are undesirable in customer facing products. These and other problems exist with regard to digital image captioning.

SUMMARY OF THE DISCLOSURE

Embodiments of the present disclosure include systems and methods for generating text descriptive of digital images, and more particularly, to systems and methods for generating text descriptive of digital images using machine learning and post-processing rules. In one embodiment, a computer-implemented method is disclosed for generating text descriptive of digital images. The method comprises using a machine learning model to pre-process an image to generate initial text descriptive of the image; adjusting one or more inferences of the machine learning model, the inferences biasing the machine learning model away from associating negative words with the image; using the machine learning model comprising the adjusted inferences to post-process the image to generate updated text descriptive of the image; and processing the generated updated text descriptive of the image outputted by the machine learning model to fine-tine the updated text descriptive of the image.

In accordance with another embodiment, a computer system is disclosed. The computer system includes: a data storage device (e.g., at least one memory) storing processor-readable instructions; and at least one processor configured to execute the instructions to perform a method. The method includes using a machine learning model to pre-process an image to generate initial text descriptive of the image; adjusting one or more inferences of the machine learning model, the inferences biasing the machine learning model away from associating negative words with the image; using the machine learning model comprising the adjusted inferences to post-process the image to generate updated text descriptive of the image; and processing the generated updated text descriptive of the image outputted by the machine learning model to fine-tine the updated text descriptive of the image.

In accordance with another embodiment, a non-transitory computer-readable medium is disclosed. The non-transitory computer-readable medium contains instructions that, when executed by a processor, cause the processor to perform a method including: using a machine learning model to pre-process an image to generate initial text descriptive of the image; adjusting one or more inferences of the machine learning model, the inferences biasing the machine learning model away from associating negative words with the image; using the machine learning model comprising the adjusted inferences to post-process the image to generate updated text descriptive of the image; and processing the generated updated text descriptive of the image outputted by the machine learning model to fine-tine the updated text descriptive of the image.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
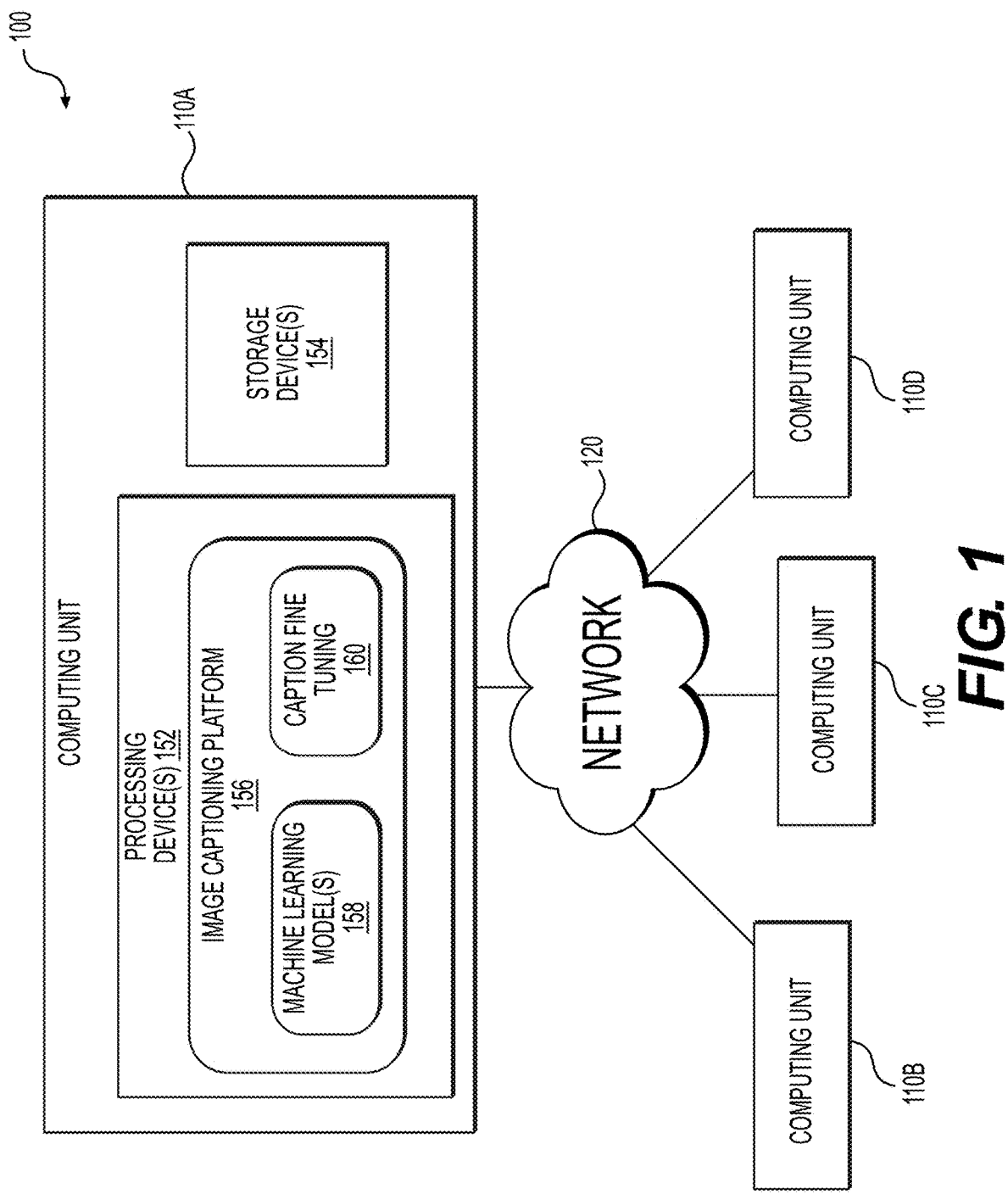
FIG. 1 depicts a schematic diagram illustrating an example of a computer network and environment within which the computer systems and methods are implemented for generating text descriptive of digital images using machine learning and post-processing rules, according to some embodiments of the present disclosure.

Reference will now be made in detail to the exemplary embodiments of the disclosure, examples of which are illustrated in the accompanying drawings. Wherever possible, the same reference numbers will be used throughout the drawings to refer to the same parts.

As described above, conventional machine learning algorithms continue to caption new images incorrectly, or in some cases, with inappropriate titles. For example, some machine learning models have insufficient vocabulary and generate negative or offensive image captions or titles. Such inaccurate and/or offensive titles are undesirable in customer facing products. Accordingly, there may be a desire for relaxing certain close-set vocabulary constraints of existing machine learning models by forcing the model to predict more general concepts, and/or to avoid certain undesirable topics or words. Accordingly, the present disclosure is directed to systems and methods for generating text descriptive of digital images using machine learning and post-processing rules.

In one embodiment, the systems and methods of the present disclosure incorporate both adjustment of machine learning model inferences (also referred to as "fine-tuning") as well as the application of post-processing rules to further fine-tune resulting image captions. In one embodiment, machine learning models are fine-tuned to suppress their likelihood of selecting words that are flagged as being more risky or otherwise undesirable. In addition, the systems and methods incorporate post-processing rules relating to one or more of: gender, offensive adjectives, low confidence adjectives, geo-location, and images with text.

The digital image captioning system provides several advantages over conventional systems. For example, the digital image captioning system improves accuracy. In particular, the digital image captioning system incorporates an adjustment of inferences generated in pre-processing to "fine-tune" image captioning in post-processing. Most existing solutions are academic models and do not cater well to real world scenarios which lack sufficient data across a wide problem-type distribution. Further, the digital image captioning system improves accuracy by addressing image captioning issues that go unnoticed by visual signals alone.

Further, the digital image captioning system improves flexibility. For example, the digital image captioning system operates independently of the image captioning model used. The digital image captioning system lends itself to real-world applications across disparate industries since the post-processing fine tuning operates irrespective of the image captioning model used.

As illustrated by the foregoing discussion, the present disclosure utilizes a variety of terms to describe features and benefits of the digital image captioning system. Additional detail is now provided regarding the meaning of these terms. For example, as used herein, the term "neural network" refers to a trainable computer-based algorithm that analyzes data to make predictions. A neural network can refer to a tunable model that is trained to make predictions based on training data. In particular, a neural network includes a computer-implemented algorithm that analyzes input (e.g., training input) such as a digital image to make predictions and that improves in accuracy by comparing generated predictions against ground truth data and modifying internal parameters for subsequent predictions. In some embodiments, a neural network can employ supervised learning, while in other embodiments a neural network can employ unsupervised learning or reinforcement learning. In the same or other embodiments, a neural network includes a convolutional neural network and/or a deep neural network.

Relatedly, the term "train" refers to utilizing information to tune or teach a neural network. The term "training" (used as an adjective or descriptor, such as "training data" or "training digital image") refers to information or data utilized to tune or teach the model.

Additionally, as used herein, the term "inference" refers to the stage in which a trained machine learning module "infers" or "predicts" values—typically, in a production phase in which a trained machine learning model predicts real world data. In particular, the term "inference" (used as a noun, such as adjust "inferences") refers to a predicted caption made by a machine learning model when pre-processing a digital image.

Further, as used herein, the term "digital image" refers to any digital symbol, picture, icon, or illustration. For example, the term "digital image" includes digital files with the following, or other, file extensions: JPG, TIFF, BMP, PNG, RAW, or PDF. The term "digital image" also includes one or more images (e.g., frames) in a digital video.

Additionally, as used herein, the term "input digital image" refers to a digital image analyzed by the digital image captioning system for generating a caption. Thus, digital images are input digital images utilized to generate the captions (i.e., sentences describing the contents of the digital images).

Further, as used herein, the terms "caption," "title," or "sentence" are used interchangeably to refer to any group of words. In particular, the terms include any group of words in a language that form a coherent thought. A caption, title, or sentence can include a phrase, a description, a title, or a grammatically complete English sentence (e.g., a subject, verb, direct object, and/or punctuation). As mentioned above, a sentence can form a "caption."

Additionally, as used herein, the term "caption" typically refers to a sentence corresponding to a digital image. In particular, the term "caption" refers to a sentence corresponding to, or descriptive of, contents of a digital image. For example, a caption can include a phrase, title, description, or grammatically complete English sentence describing the contents of a digital image.

Turning now to the figures, additional detail will be provided regarding generating captions for input digital images in accordance with one or more embodiments of the digital image captioning system. FIG. 1 depicts a schematic diagram illustrating an example of a computer network and environment within which the computer systems and methods disclosed herein are implemented according to some embodiments of the present disclosure.

In particular, FIG. 1 illustrates a schematic diagram of one embodiment of an exemplary environment 100 in which the digital image captioning system operates. In one or more embodiments, the exemplary environment 100 includes one or more computing units 110A-110D and a network 120. The network 120 includes any suitable network over which the computing units 110A-110D communicate. As shown in FIG. 1, computing unit 110A includes any combination of processing devices 152 and storage devices 154. Example hardware of processing devices, storage devices, and networks consistent with the present disclosure are discussed in more detail below with regard to FIG. 7.

In relation to the embodiment of FIG. 1, processing devices 152 of computing unit 110A is configured to execute an image captioning platform 156 for generating captions of digital images. Image captioning platform 156 includes one or more machine learning models 158 and caption fine tuning modules 160. Thus, at a high level, machine learning models 158 and caption fine tuning modules 160 are configured to process images received from computing units 110B-110D, storage devices 154, or from any other computing unit connected to network 120 in order to generate text (e.g., captions or titles) descriptive of the subject matter of those images.

The computing unit 110A illustrated in FIG. 1 includes any desired type of computing device. For instance, in one or more embodiments, one or more of the computing units 110B-110D comprise one or more computing devices described below in relation to FIG. 7. Furthermore, computing unit 110A is implemented as one or more operating systems, as one or more stand-alone applications, as one or more modules of an application, as one or more plug-ins, as one or more library functions or functions that may be called by other applications, and/or as a cloud-computing model. Alternatively, the computing unit 110A is implemented as a stand-alone application, such as a desktop or mobile application. Alternatively, the computing unit 110A is implemented as one or more web-based applications hosted on a remote server. The computing unit 110A is also implemented in a suite of mobile device applications or "apps." To illustrate, the computing unit 110A is implemented in an application, including but not limited to ADOBE ACROBAT software, ADOBE EXPERIENCE MANAGER software, ADOBE STOCK software, ADOBE PHOTOSHOP software or ADOBE ILLUSTRATOR software. "ADOBE," "ACROBAT," "EXPERIENCE MANAGER," "STOCK," "PHOTOSHOP," and "ILLUSTRATOR," are either registered trademarks or trademarks of Adobe Systems Incorporated in the United States and/or other countries.

As described above, the computing unit 110A of environment 100 is configured to generate, store, receive, and transmit any type of data, including caption encoder neural networks, caption decoder neural networks, image encoder neural networks, training sentences, training images and training captions, input digital images, and captions. As illustrated, in one or more embodiments, the computing unit 110A includes all, or a portion of, the image captioning platform 156. In particular, the image captioning platform 156 comprises an application running on computing unit 110A (as part of the image captioning platform 156) or a portion of a software application that can be downloaded from the computing unit 110A. For example, the image captioning platform 156 is configurable to include a web hosting application that allows computing units 110B-110D to interact with content hosted at the computing unit 110A. To illustrate, in one or more embodiments of the exemplary environment 100, one or more computing units 110B-110D can access a webpage supported by computing unit 110A. In particular, any one of computing units 110A, 110B, or 110C, is configurable to run an application to allow a user to access, view, and/or interact with a webpage or website hosted at computing unit 110A.

For example, computing unit 110A transmits data to one computing unit, such as, e.g., computing unit 110B. Alternatively, computing unit 110A also transmits electronic messages between one or more users of the environment 100. In one example embodiment, computing device 110A include content servers, databases, and/or image management systems, as described in greater detail below. Computing unit 110A is configurable to include a communication server or a web-hosting server. Additional details regarding the computing unit 110A will be discussed below with respect to FIG. 7.

In one embodiment, computing unit 110A includes an image management system. The image management system also includes an implementation of software, hardware, or both for managing one or more digital images, such as images stored in storage devices 154 or any other cloud storage devices. For example, in one or more embodiments, the image management system comprises software (such as ADOBE STOCK software) that maintains. manages, and/or provides a repository of digital images for utilization by a plurality of computing devices. Similarly, in one or more embodiments, the image management system comprises software that manages digital images captured by any one of computing units 110B, 110C, or 110D, and stored at the computing unit 110D.

Although FIG. 1 illustrates a particular arrangement of the computing units 110A-110D and the network 120, various additional arrangements are possible. For example, while FIG. 1 illustrates multiple separate computing devices 110B-110D communicating with the computing unit 110A via the network 120, in one or more embodiments a single computing device (e.g., computing device 110B, 110C, or 110D) is configurable to communicate directly with the computing unit 110A, bypassing the network 120.

Similarly, although the environment 100 of FIG. 1 is depicted as having various components, the environment 100 is configurable to include additional or alternative components. For example, the image captioning platform 156 is configurable to be implemented on a single computing device. In particular, the image captioning platform 156 is configurable to be implemented in whole by the computing unit 110A, or the image captioning platform 156 is configurable to be implemented in whole by the server(s) 150. Alternatively, the image captioning platform 156 is configurable to be implemented across multiple devices or components (e.g., utilizing the computing devices 110B-110D).

Figure 2:
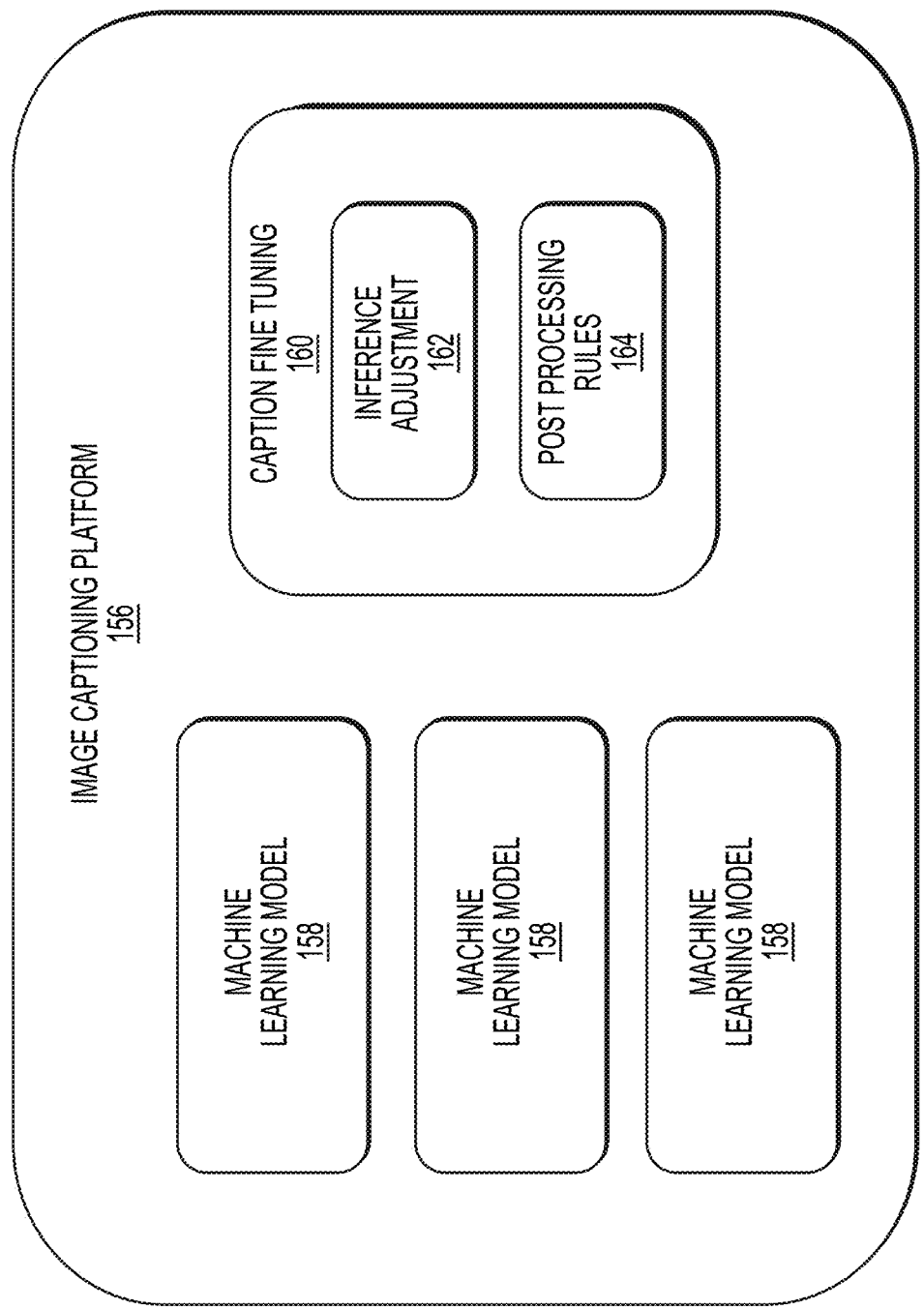
FIG. 2 depicts a block diagram illustrating an exemplary image captioning platform for generating text descriptive of digital images using machine learning and post-processing rules, according to some embodiments of the present disclosure.

FIG. 2 depicts a block diagram illustrating an exemplary image captioning platform 156 according to some embodiments of the present disclosure. In particular, as shown in FIG. 2, image captioning platform 156 comprises a plurality of machine learning models 158, and one or more caption fine-tuning modules 160. In one embodiment, caption fine-tuning modules 160 comprise an inference adjustment module 162 and post-processing rules 164. In one embodiment, inference adjustment module 162 communicates and even adjust inferences or other parameters of one or more of machine learning models 158. By contrast, post-processing rules 164 is configured to be executed on outputs of machine learning model(s) 158. In other words, inference adjustment module 162 is configured to adjust the image captions that one more of machine learning models 158 outputs, after which post processing rules 164 is configured to further refine, "fine-tune," or otherwise modify those output captions.

It should be appreciated that one benefit of the present embodiments is that the operation of caption fine tuning modules 160, including inference adjustment module 162 and post processing rules 164 is that they are independent of and agnostic to the type of machine learning models used to generate image captions. Therefore, machine learning models 158 comprise any desired type or combination of machine learning algorithms for generating image captions. In one embodiment, machine learning models 158 comprise convolutional neural networks including, for example, a trained image encoder neural network and a trained sentence decoder neural network configured to generate captions of digital images. In one embodiment, the machine learning models 158 comprise a sentence decoder neural network trained utilizing an auto-encoder that also includes a sentence encoder neural network and a classifier.

One or more embodiments of the present disclosure include a digital image captioning system that trains an image encoder neural network and a sentence decoder neural network to generate captions for input digital images. For example, in one or more embodiments, the digital image captioning system trains an image encoder neural network to generate, from digital images, feature vectors in a semantic space. The digital image captioning system also trains a sentence decoder neural network to generate captions based on feature vectors in the semantic space. The digital image captioning system then utilizes the trained image encoder neural network and the trained sentence decoder neural network to generate captions for input digital images.

As used herein, the term "neural network" refers to any machine learning model that is tuned (e.g., trained) based on inputs to approximate unknown functions. In particular, the term "neural network" can include a model of interconnected layers that communicate and analyze attributes at varying degrees of abstraction to learn to approximate complex functions and generate outputs based on a plurality of inputs provided to the model. For instance, the term "neural network" includes one or more machine learning algorithms. In particular, the term "neural network" includes convolutional neural networks (i.e., "CNNs"), fully convolutional neural networks (i.e., "FCNs"), or recurrent neural networks (i.e., "RCNs"). In other words, a neural network includes an algorithm that implements deep learning techniques, i.e., machine learning that utilizes a set of algorithms to attempt to model high-level abstractions in data.

Moreover, as used herein, the term "image encoder neural network" refers to a neural network that encodes a digital image. In particular, the term "image encoder neural network" includes a neural network that generates a vector (e.g., a feature vector) in a semantic space from a digital image. The term "feature vector" as used herein refers to a numerical representation of features. In particular, the term "feature vector" includes an n-dimensional vector of numerical features. For example, a feature vector includes a 500-dimensional vector of numerical features in a semantic space, where the values of the feature vector encapsulate a semantic meaning within the semantic space. In one embodiment, the machine learning algorithm may implement a sentence encoder neural network that encodes a sentence as a vector (e.g., a feature vector) in a semantic space. Alternatively or in addition, the machine learning algorithm may implement a sentence decoder neural network that decodes a sentence (or caption).

In relation to FIGS. 1-2, the image captioning platform 156 applies one or more trained machine learning models 158 to digital images received from any local or network device. The trained machine learning models 158 generate feature vectors corresponding to the digital images in a semantic space and then applies a trained sentence/caption decoder neural network (i.e., a trained sentence decoder neural network trained) to the feature vectors corresponding to the digital images. Applying the sentence decoder neural network results in generating suitable initial captions corresponding to the digital images.

Image captioning system 156 may be configured to provide captions for presentation via any desired computing device, and in any of a variety of different formats. For example, the image captioning platform provides captions for display, audibly (e.g., utilize text-to-speech software so that a user of a computing unit 110A can hear the captions). Similarly, the image captioning platform can provide the captions for presentation via a brail generator or other physical manifestation. Thus, as shown, the digital image captioning system can automatically generate a caption that corresponds to an input digital image and provide the caption for presentation via a computing device.

In addition to providing a caption via a computing device, the digital image captioning system can utilize generated captions in a variety of other ways. For example, the digital image captioning system can store captions corresponding to digital images and utilize the captions to search for digital images. To illustrate, the digital image captioning system is configured to conduct a word search query by analyzing captions of digital images in a database of digital images. Similarly, the digital image captioning system is configured to generate captions for a repository of digital images and provide the repository of digital images with the captions for display (e.g., thumbnail digital images with captions) to assist a user in searching or organizing the repository of digital images.

The digital image captioning system is configured to utilize a variety of different sources to access training sentences/captions. For example, in one or more embodiments, the digital image captioning system utilizes the BookCorpus dataset described in Zhu, Y., Kiros, R., Zemel, R., Salakhutdinov, R., Urtasun, R., Torralba, A., & Fidler, S., Aligning books and movies: Towards story-like visual explanations by watching movies and reading books, In Proceedings of the IEEE International Conference on Computer Vision, 19-27 (2015), the entire contents of which are hereby incorporated by reference. BookCorpus contains 80 million sentences from books and movie subtitles. In addition to BookCorpus, the digital image captioning system is configured to utilize any repository of sentences for any variety of languages.

By way of example, in one or more embodiments, the computing unit 110A accesses a plurality of training captions and a plurality of training images with corresponding training captions. The computing unit 110A utilizes the training sentences to train a sentence encoder neural network and a sentence decoder neural network utilizing an adversarial classifier and the training sentences. Moreover, the computing unit 110A training an image encoder neural network, the sentence encoder neural network, and the sentence decoder neural network utilizing a semantic similarity constraint, the training images, and the corresponding training captions. Upon training the image encoder neural network and the sentence decoder neural network, the computing unit 110A receive from any of the computing devices 110B-110D a request for a caption for an input digital image (e.g., an input digital image managed by the image management system of storage devices 154). The computing unit 110A utilizes the image encoder neural network to generate a feature vector of the input digital image in a semantic space. The computing unit 110A also utilizes the sentence decoder neural network to generate a caption for the input digital image from the feature vector in the semantic space. The computing unit 110A then provide the generated caption to the computing unit 1106.

Figure 3:
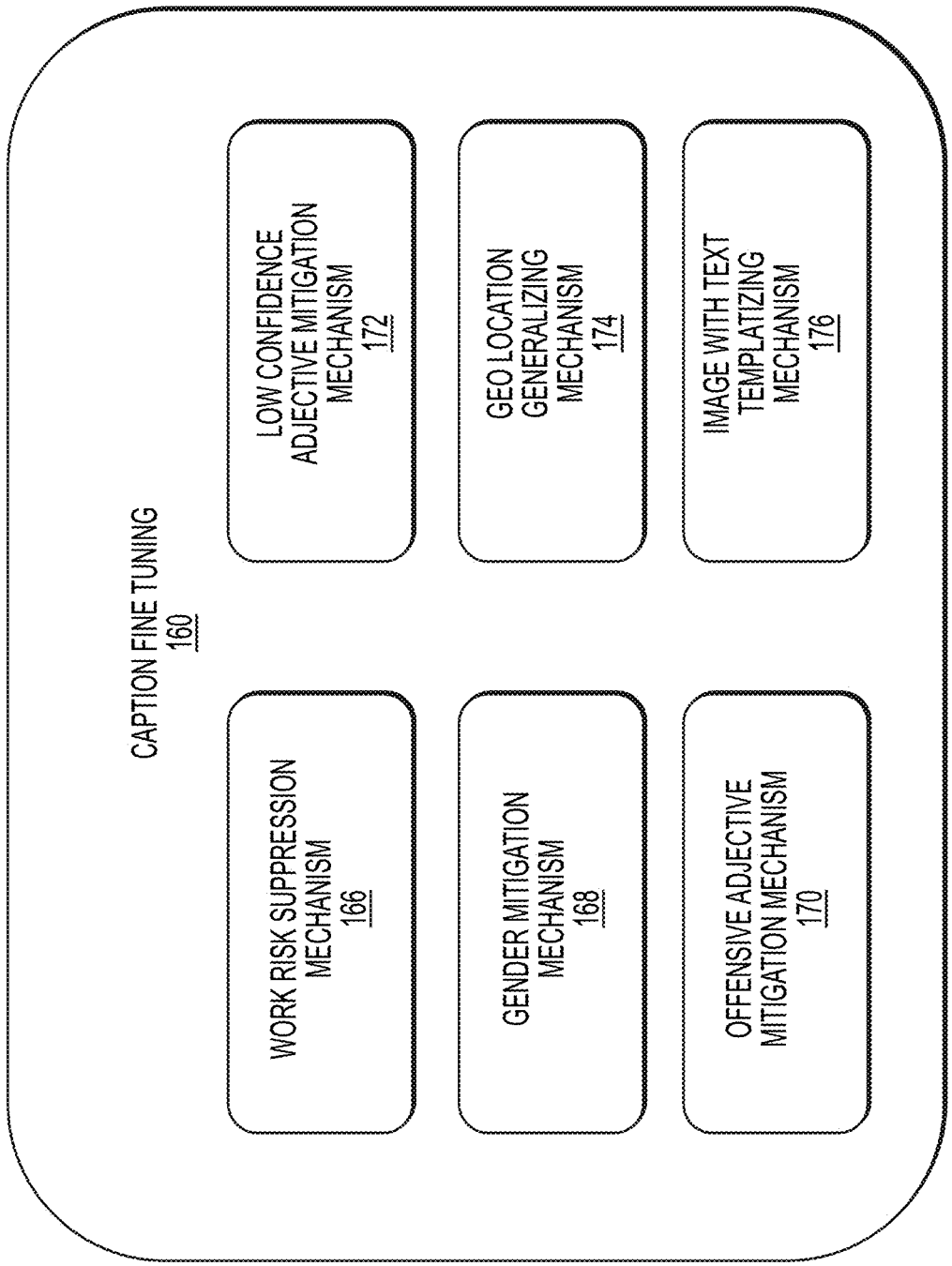
FIG. 3 depicts a block diagram illustrating exemplary caption fine tuning modules of an image captioning platform, according to some embodiments of the present disclosure.

As described above, caption fine tuning modules 160 comprise modules (e.g., inference adjustment module 162 and post processing rules 164) to adjust and post-process results of machine learning models 158. FIG. 3 depicts a block diagram illustrating exemplary caption fine tuning modules 160 of an image captioning platform 156 according to some embodiments of the present disclosure. In particular, as shown in FIG. 3, caption fine tuning modules 160 may include one more of: a word risk suppression mechanism 166, a gender mitigation mechanism 168, an offensive adjective mitigation mechanism 170, a low confidence adjective mitigation mechanism 172, a geo-location generalizing mechanism 174, and an image with text templatizing mechanism 176. It should be appreciated that the various combinations of modules of caption fine tuning modules 160 are exemplary, and that any of the depicted modules are configured to be omitted, combined with other depicted modules, and/or supplemented with other caption fine tuning modules.

In one embodiment, word risk suppression mechanism 166 operates as a component of inference adjustment module 162 (from FIG. 2), which impacts the operation of one or more machine learning models 158, whereas mechanisms 168-176 of the caption fine tuning modules 160 operate as post-processing rules 164 (from FIG. 2). One or more of the word risk suppression mechanism 166, gender mitigation mechanism 168, offensive adjective mitigation mechanism 170, low confidence adjective mitigation mechanism 172, geo-location generalizing mechanism 174, and image with text templatizing mechanism 176 is configured to be used in any combination or sequence to modify the operation of machine learning models 158, and/or to change their outputs, either during or after their operation. The operation of the exemplary mechanisms of FIG. 3 will now be described in greater detail with reference to several non-limiting examples below.

Word Risk Suppression Mechanism

As described above, inference adjustments of machine learning models are programmed to generate image captions in a way that biases the machine learning algorithms away from words considered to be risky. Thus, a word risk suppression mechanism 166 of caption fine tuning modules 160 is configured to perform one or more of the following steps. Specifically, word risk suppression mechanism 166 is configured to generate a list of curated words using algorithm assistance and/or human curation, identified according to their associated qualitative risk levels (ranging from none to very high). Word risk suppression mechanism 166 assigns a monotonic mapping from the risk level to the amount of suppression desired to apply to the neural network's likelihood of selecting those words. In other words, since the neural network model is not naturally taking into account the riskiness of the words involved when it generates language, the machine learning model may be forced by the word risk suppression mechanism 166 to bias itself away from those words, at levels according their risks. The model then will still choose those words only if the confidence it had was sufficiently high to overcome our bias against it (e.g., relative to the confidences the neural network had to the next most likely words in its lexicon). In one embodiment, word risk suppression mechanism 166 may perform this biasing by, for each time when the model is to infer the next word, multiplying the post-softmax likelihoods (or, in an alternative implementation, the pre-softmax logits) by a factor inversely proportional to the risk of inclusion of that word ranging from a multiplicative factor of 0.0 for full suppression to 1.0 for no manipulation of that word. This effective likelihood is then used instead of the raw likelihood for selection of the inferred word and for calculation of the scores used for beam search (or other sentence-level likelihood method).

Figure 4A:
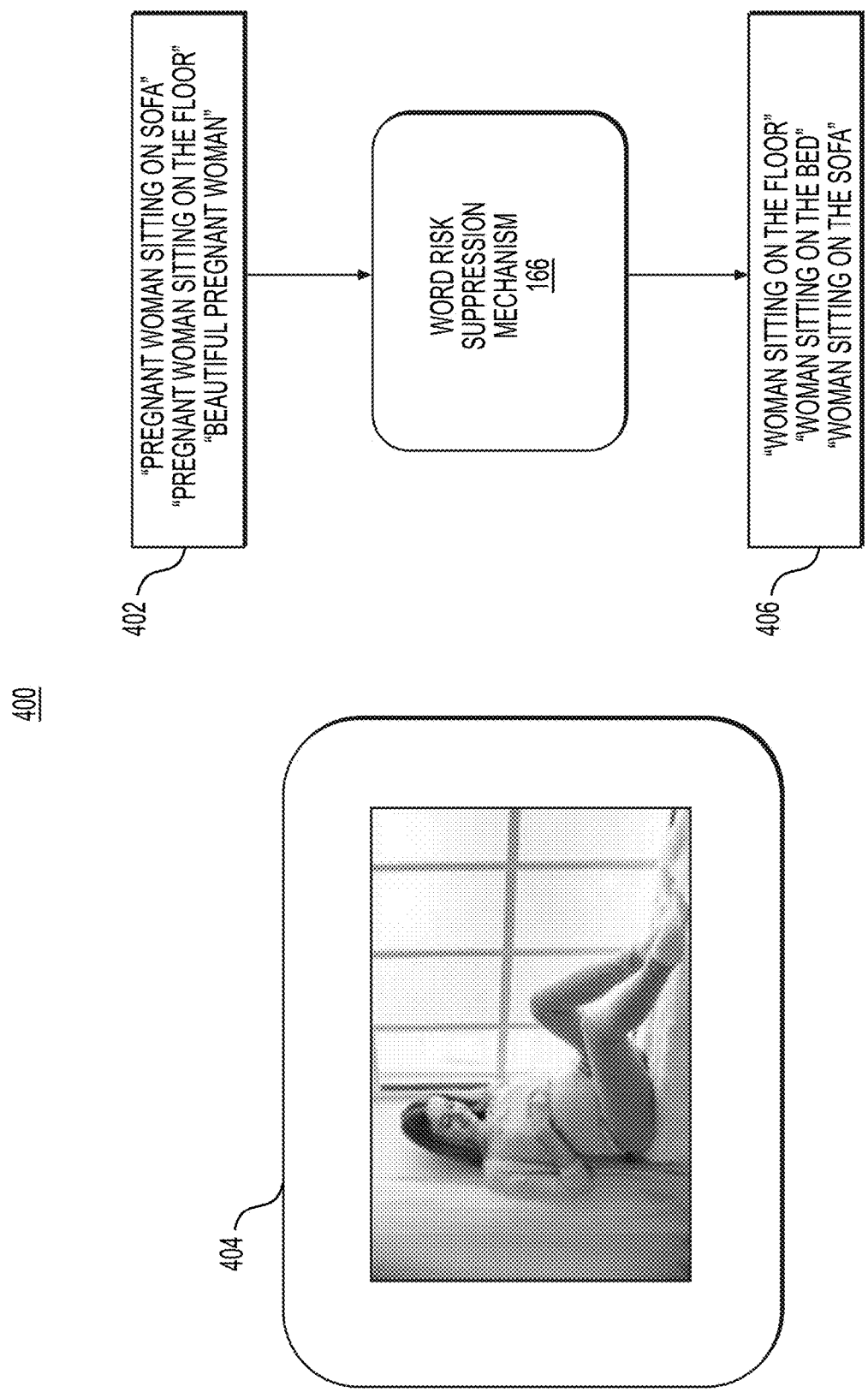
FIG. 4A depicts a block diagram illustrating exemplary caption fine tuning using a word risk suppression mechanism, according to some embodiments of the present disclosure.

FIG. 4A depicts an image 404 undergoing a post-processing rule 164 to adjust processing results 402 of machine learning models 158, according to one aspect of the present disclosure. In one embodiment, the word risk suppression mechanism 166 of caption fine tuning 160 receives processing results 402 as input to adjust and generate fine-tuned image captions 406 associated with image 404. For example, the word suppression mechanism 166 is configured to receive processing results 402, such as, e.g., "pregnant woman sitting on sofa," "pregnant woman sitting on the floor," or "beautiful pregnant woman." The word suppression mechanism 166 may adjust the processing results 402 to generate fine-tuned image captions 406, such as, e.g., "woman sitting on the floor," "woman sitting on the bed," or "woman sitting on the sofa."

Gender Mitigation Mechanism

In one embodiment, a goal of the gender mitigation mechanism 168 encourages the machine learning models 158 (e.g., neural network models) to manipulate its likelihood for gendered words (pronouns, gendered professions, gendered relations, gendered nouns, gendered adjectives, etc.) towards gender neutral words whenever it is not strongly confident in one gender vs the other. For example, gender mitigation mechanism 168 is configured to replace the words 'boy' or 'girl' with the gender neutral word 'child'. When a neural network mistakes the gender of a subject in an image, and/or a neural network can in some cases have a similarly high confidence in both the male and female version of a word and yet still choose a gendered word over the gender neutral version. However, the gender neutral version of the word is often the desired word to use, despite this not being reflected in the dataset that the neural network is learning from.

Thus, gender mitigation mechanism 168 is configured to bias the model's selection (the word likelihoods) towards preferring gender neutral terms whenever the confidence of the male and female versions of a word are similar. Gender mitigation mechanism 168 will still allow gendered words whenever the model is sufficiently confident in the male or female version of the word as compared to the other. To provision the algorithm, gendered word triplets are manually collected, corresponding to male vs. female vs. gender neutral words (an example is 'king' vs 'queen' vs 'monarch').

There are multiple ways that gender mitigation mechanism 168 is configured to achieve this goal. In one embodiment, gender mitigation mechanism 168 is configured such that, for each of the triplets from the above gender-triplet-reference collection, at each point at which the model is to infer the next word, gender mitigation mechanism 168 is configured to calculate the likelihoods of each pair of the two gendered words, calculate a percentage of the lower of the two, subtract the calculated percentage from both gendered words, and assign that 'lost' likelihood percentage to the gender neutral version. After experimentation, it was discovered that additional suppression of both gendered terms' likelihood by a percentage (and then adding that amount back to the likelihood of the gender neutral term) also helped when combined with this mechanism.

The result is a mechanism that biases the likelihoods of each word in the gender triplet to be more likely to choose the gender neutral word under normal circumstances and more likely to choose the gender neutral word when the likelihoods of the two gendered words had significant discrepancies. Again, these modified/effective likelihoods are then used instead of the raw likelihoods for selection of the inferred word and for calculation of the scores used for beam search (or other sentence-level likelihood method).

Figure 4B:
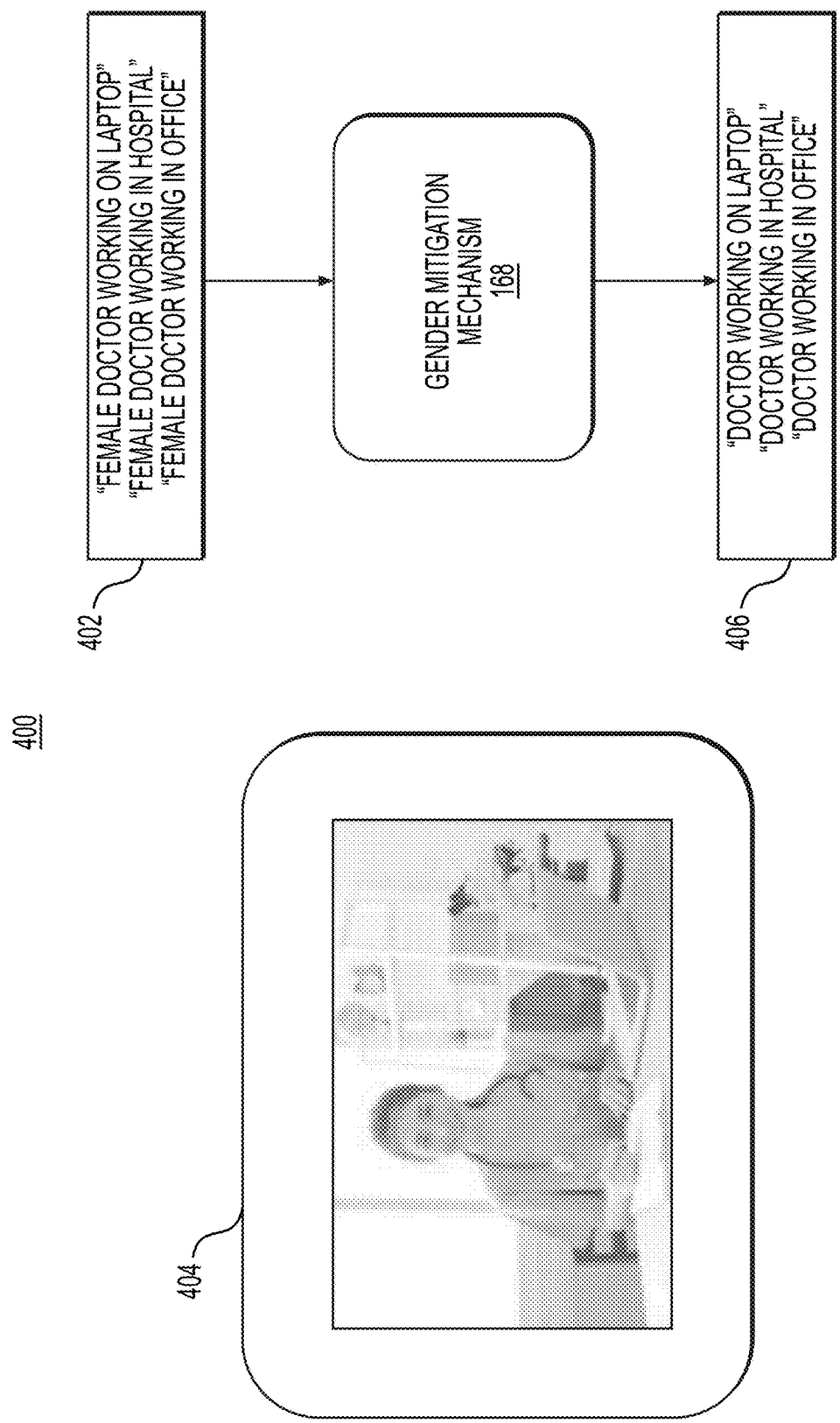
FIG. 4B depicts a block diagram illustrating exemplary caption fine tuning using a gender mitigation mechanism, according to some embodiments of the present disclosure.

FIG. 4B depicts an image 404 undergoing a post-processing rule 164 to adjust processing results 402 of machine learning models 158, according to one aspect of the present disclosure. In one embodiment, the gender mitigation mechanism 168 of caption fine tuning 160 receives processing results 402 as input to adjust and generate fine-tuned image captions 406 associated with image 404. For example, the gender mitigation mechanism 168 receives processing results 402, such as, e.g., "female doctor working on laptop," "female doctor working in hospital," or "female doctor working in office." The gender mitigation mechanism 168 adjusts the processing results 402 to generate fine-tuned image captions 406, such as, e.g., "doctor working on laptop," "doctor working in hospital," or "doctor working in office."

Offensive Adjective Mitigation Mechanism

For customer facing applications and products, it is important to be conservative in the kind of description given to a person noun. A person noun can be anything that represents a person's identity. For example, words describing the occupation of a person like "framer," "policeman," etc. or genders like "waitress," "boyfriend," etc. It is important to confirm that the descriptive word parts of these words (adjective or compound noun) avoids making the phrase output inaccurate, offensive, or otherwise undesirable to the user in any way.

Since the output of machine learning models 158 is so dependent on the training data, certain models are trained with datasets containing captions that are acceptable for one product from which the data is collected, but not acceptable for another product. In some cases, even words that are ranked very high risk (related to race, gender, ethnicity, sexuality, etc.) may nevertheless be allowed if they have a high confidence (softmax probability). Emotion words like "disgusted" can be allowed only even the model is having a high confidence that the person in the image is actually feeling the emotion. As an example, even calling a young person in the image "old" or "senior" can be offensive to some users, so age related words may be added to the category of adjectives used only if they have high confidence.

Thus, in one embodiment, an offensive adjective mitigation mechanism 170 comprises a plurality of categories for person adjectives. In one embodiment, offensive adjective mitigation mechanism 170 comprises three (3) categories of adjectives for mitigation, including: "ban," "high risk," and "low risk." Some words fall clearly into a "ban" category. Other words are divided into low and high risk category depending on their risk factor. As the vocabulary used to generate image captions and titles is limited (typically around ~14 k words), the words for these categories can be selected from the dictionary itself which was used to train the model. In one embodiment, one or more Parts-of-Speech (POS) libraries may be used by the offensive adjective mitigation mechanism 170 to detect the adjectives in the vocabulary of an outputted caption. Offensive adjective mitigation mechanism 170 then parses the generated adjective list and short-list the adjectives that are offensive based on the extent of their offensiveness.

In one embodiment, offensive adjective mitigation mechanism 170 is configured to detect all the person nouns. Again, offensive adjective mitigation mechanism 170 is configured to use POS libraries to identify all nouns in the vocabulary. The offensive adjective mitigation mechanism 170 then parses the identified nouns and filter out the non-person nouns. Once the titles are generated from the beam search mechanism, offensive adjective mitigation mechanism 170 goes through each word in the title and detect the person-nouns using the shortlisted person noun vocabulary collected from the model dictionary. Offensive adjective mitigation mechanism 170 then checks if any of the continuous group of adjectives just before the person noun are present in any of the identified (e.g., three above) categories. If an adjective is not present in any list, then offensive adjective mitigation mechanism 170 does nothing to the adjective. If the word is present in the ban category, then offensive adjective mitigation mechanism 170 removes it from a generated caption. For adjectives found in the high and low risk category, offensive adjective mitigation mechanism 170 set a threshold accordingly and if the softmax score of the word is below the threshold, we remove it, or else we do nothing to the word. The thresholds are selected by doing testing with different threshold values on a set of validation samples.

Low Confidence Adjective Mitigation Mechanism

When machine learning models 158 are trained with a real world dataset, the training data can be noisy and biased. Noisy data can lead to machine learning models generating adjectives that do not justify the noun it is describing. Those adjectives may therefore have low confidence. Biased data will cause the machine learning models to generate adjectives which are very frequent and may not necessarily be the best representation for the noun. Also, if training a model with long captions, the model may have a higher probability of getting the adjective wrong. If the priority of the product application is strict, then it can be important to reduce most of the false positives even if that results in losing out on few true positives due to user sensitivity or if the product does not necessarily require very descriptive captions.

Thus, low confidence adjective mitigation mechanism 172 is configured to remove adjectives that lie below a certain threshold. In one embodiment, low confidence adjective mitigation mechanism 172 is configured to identify two (2) kinds of adjectives (words) that describe a noun: common adjectives (green leaf) and compound nouns (noun before a noun, e.g. chocolate cake). In one embodiment, low confidence adjective mitigation mechanism 172 is configurable to have different thresholds for each of the two types of adjectives. After the captions are generated from the beam search mechanism of any machine learning algorithm 158, then the adjectives are detected using part-of-speech (POS) analysis. If the adjective was not already removed by the offensive adjective mitigation mechanism 170, then low confidence adjective mitigation mechanism 172 checks if the adjective was below the decide threshold and remove the word if it is. The thresholds are selected by doing testing with different threshold values on a set of validation samples.

Figure 4C:
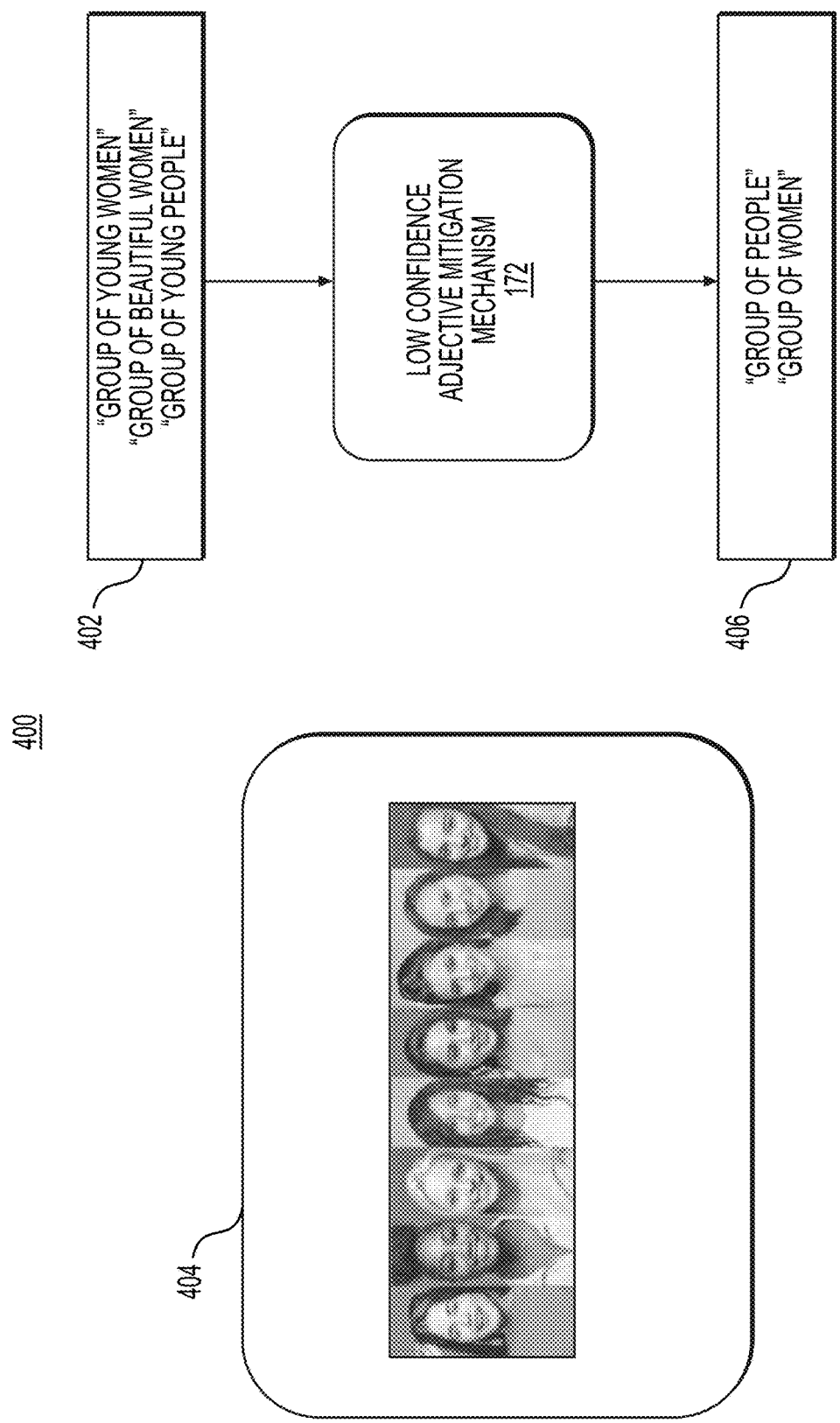
FIG. 4C depicts a block diagram illustrating exemplary caption fine tuning using a low confidence adjective mitigation mechanism, according to some embodiments of the present disclosure.

FIG. 4C depicts an image 404 undergoing a post-processing rule 164 to adjust processing results 402 of machine learning models 158, according to one aspect of the present disclosure. In one embodiment, the low confidence adjective mitigation mechanism 172 of caption fine tuning 160 receives processing results 402 as input to adjust and generate fine-tuned image captions 406 associated with image 404. For example, the low confidence adjective mitigation mechanism 172 receives processing results 402, such as, e.g., "group of young women," "group of beautiful women," or "group of young people." In response, the low confidence adjective mitigation mechanism 172 adjusts the processing results 402 to generate fine-tuned image captions 406, such as, e.g., "group of people" or "group of women."

Geo-Location Generalizing Mechanism

In the field of captioning images, many images may depict fine-grained geo locations, such as bridges and skylines that may not be very easily recognizable from different angles/styles of images for the same place. Since there are numerous geo locations in the world, when a machine learning model 158 tries to predict a specific location that is not part of its vocabulary, it will try to predict a location only from the set it has seen during training. This bias towards a set of finite location vocabulary is undesirable in real world situations where the algorithm does not know what location images the model will see during inference.

To solve these issues with the model, geo-location generalizing mechanism 174 may be configured to generalize any geographic locations identified by a machine learning model 158 to be included as part of a generated caption. In one embodiment, geo-location generalizing mechanism 174 may operate by first running a named entity recognition model on all training titles. Thus, geo-location generalizing mechanism 174 may generate a list of all phrases that correspond to a potential location entity. Geo-location generalizing mechanism 174 may then automatically review and refine this set. Geo-location generalizing mechanism 174 may then automatically create a mapping dictionary from these fine-grained location entities to more general location entities. For example, the word "Australia" is converted to "country," and the word "Seattle" is converted to "city." The generated title from the machine learning model 158 may pass through this mapping of geo-location generalizing mechanism 174, recursively, to output the geo-normalized titles (for example, an initial output of "Seattle skyline" may be converted to "city skyline").

Figure 4D:
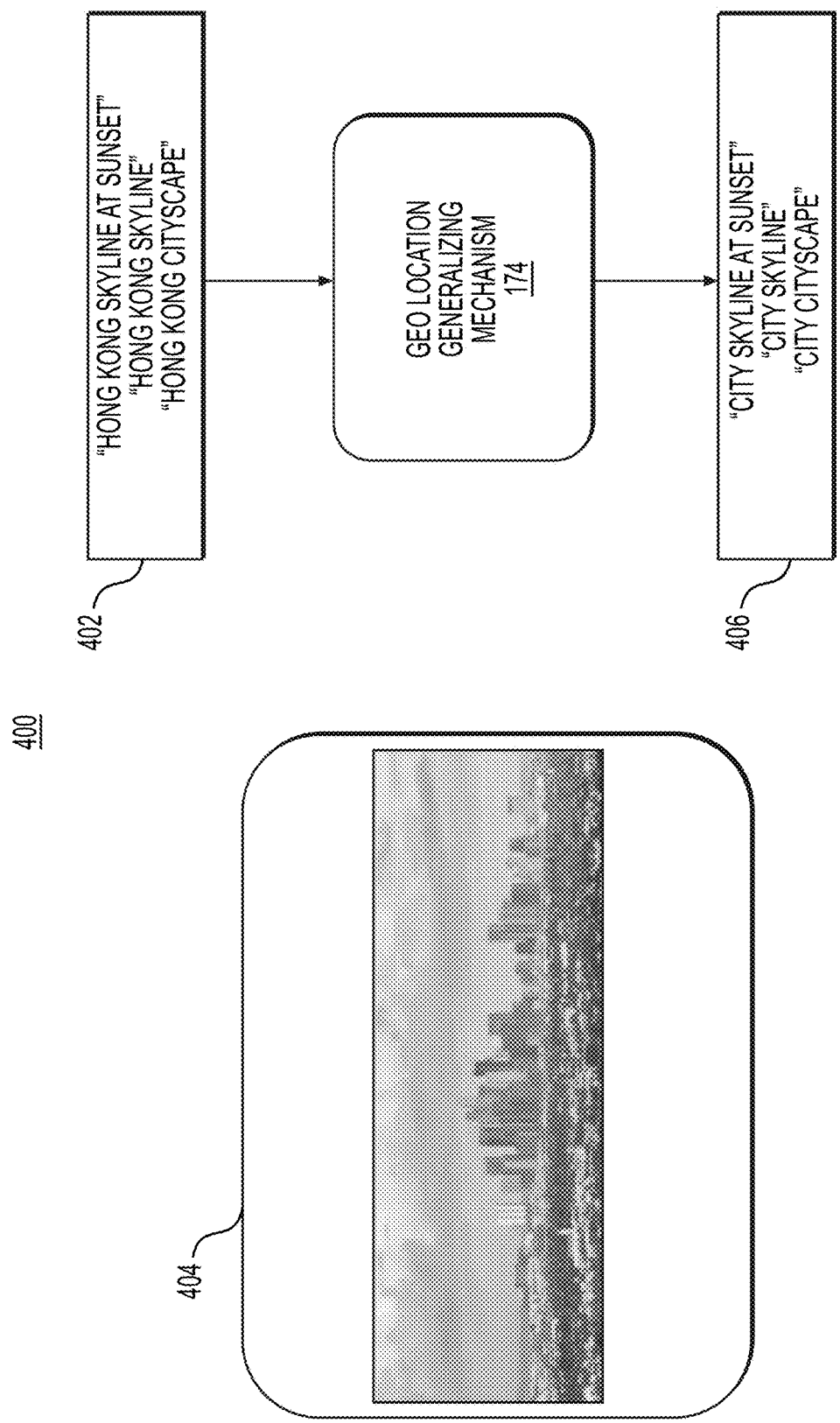
FIG. 4D depicts a block diagram illustrating exemplary caption fine tuning using a geo location generalizing mechanism, according to some embodiments of the present disclosure.

FIG. 4D depicts an image 404 undergoing a post-processing rule 164 to adjust processing results 402 of machine learning models 158, according to one aspect of the present disclosure. In one embodiment, the geo location generalizing mechanism 174 of caption fine tuning 160 receives processing results 402 as input to adjust and generate fine-tuned image captions 406 associated with image 404. For example, the geo location generalizing mechanism 174 may receive processing results 402, such as, e.g., "Hong Kong skyline at sunset," "Hong Kong Skyline," or "Hong Kong cityscape." The geo location generalizing mechanism 174 may adjust the processing results 402 to generate fine-tuned image captions 406, such as, e.g., "city skyline at sunset", "city skyline," or "city cityscape."

Image with Text Templatizinq Mechanism

A machine learning model's beam search model combined with the mechanisms above can handle most customer facing cases, but images with text may form another unique challenge for an image captioning algorithm. Since the beam search model has no knowledge about the text on the image, the generated titles are sometimes either wrong or not accurate enough. For this category of images, an image with text templatizing mechanism 176 may be configured to take advantage of optical character recognition (OCR) machine learning services. Specifically, the image with text templatizing mechanism 176 may use an OCR service to provide information on what text X is within the image itself. Thus, caption fine tuning modules 160 selectively instructs the image with text templatizing mechanism 176 to form the image caption/title in the format of "Image with text X". The switch between whether to use beam search title (e.g., from machine learning models 158) or to use a templatized title would depend on how much area of the image the text occupies. Since the OCR service also returns the bounding box of the text, the image with text templatizing mechanism 176 can calculate the area of the text. If the ratio between the text area and the image area is above a pre-defined threshold, then the image with text templatizing mechanism 176 may use templatized title. If the ratio between the text area and the image area is below a pre-defined threshold, then the image with text templatizing mechanism 176 may keep using the beam search title.

Figure 5:
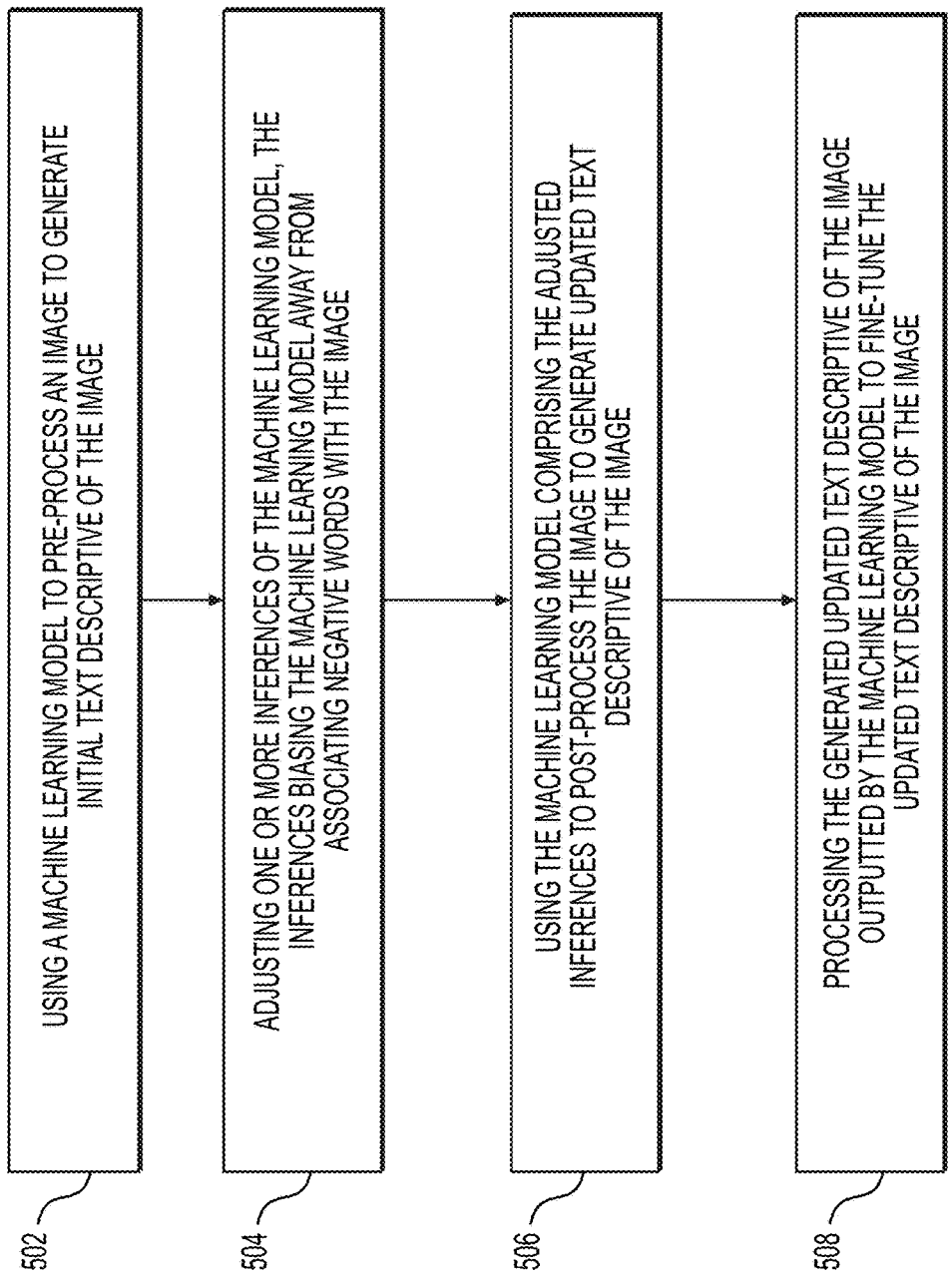
FIG. 5 depicts a flowchart of an exemplary method of generating text descriptive of digital images using machine learning and post-processing rules, according to some embodiments of the present disclosure.

FIGS. 1-4D, the corresponding text, and the examples, provide a number of different systems and devices for generating text descriptive of digital images using machine learning and post-processing rules. In addition to the foregoing, embodiments can also be described in terms of flowcharts comprising acts in a method for accomplishing a particular result. For example, FIGS. 4 and 5 illustrate flowcharts of exemplary methods in accordance with one or more embodiments. The methods described in relation to FIGS. 4 and 5 may be performed with less or more acts or the acts may be performed in differing orders. Additionally, the acts described herein may be repeated or performed in parallel with one another or in parallel with different instances of the same or similar steps/acts.

FIG. 5 illustrates a flowchart of a series of acts in a method 500 of generating captions reflecting digital image contents. In one or more embodiments, the method 500 is performed in a digital medium environment that includes the digital image captioning platform 156. The method 500 is intended to be illustrative of one or more methods in accordance with the present disclosure, and is not intended to limit potential embodiments. Alternative embodiments can include additional, fewer, or different steps than those articulated in FIGS. 5-6.

FIG. 5 depicts a flowchart of an exemplary method 500 of generating text descriptive of digital images using machine learning and post-processing rules. In one embodiment, method 500 comprise using a machine learning model to pre-process an image to generate initial text descriptive of the image (Step 202). For example, the method may comprise receiving one or more images at image captioning platform 156 received from one or more storage devices 154, computing devices 110A-110C, or any other local device or remote/cloud storage device or application. Image captioning platform 156 may then use one or more machine learning models 158 to generate an initial caption of the one or more images.

Method 500 further comprises adjusting one or more inferences of the machine learning model, the inferences biasing the machine learning model away from associating negative words with the image (Step 504). In one embodiment, step 504 may comprise adjusting the one or more inferences of the machine learning model during beam search of the machine learning model to adjust posterior probabilistic of selected words of the text. In one embodiment, adjusting one or more inferences of the machine learning model comprise identifying a plurality of negative words, each of the plurality of negative words having a quantitative risk ranging from no or low risk to very high risk; and monotonic mapping from a risk level of each of the plurality of negative words to an amount of suppression to apply to the machine learning model's likelihood of selecting those respective negative words. In one embodiment, the step of monotonic mapping comprises: for each time the machine learning model is to infer a next word of the text descriptive of the image, multiply post-softmax likelihoods or pre-softmax logits by a factor inversely proportional to the quantitative risk of the respective word, ranging from a multiplicative factor of 0.0 for full suppression to 1.0 for no suppression.

Method 500 may further comprise using the machine learning model comprising the adjusted inferences to post-process the image to generate updated text descriptive of the image (Step 206).

Method 500 may further comprise processing the generated updated text descriptive of the image outputted by the machine learning model to fine-tine the updated text descriptive of the image (Step 508). In one embodiment, step 508 may comprise processing the generated updated text descriptive of the image using pure natural language processing or text-based rules overlaid on part-of-speech (POS) libraries. In one embodiment, processing the generated updated text descriptive of the image to fine-tine the updated text descriptive of the may comprise applying one or more of: a gender mitigation mechanism, an offensive adjective mitigation mechanism, a low confidence adjective mitigation mechanism, a geo-location generalizing mechanism; and an image with text templatizing mechanism.

Figure 6:
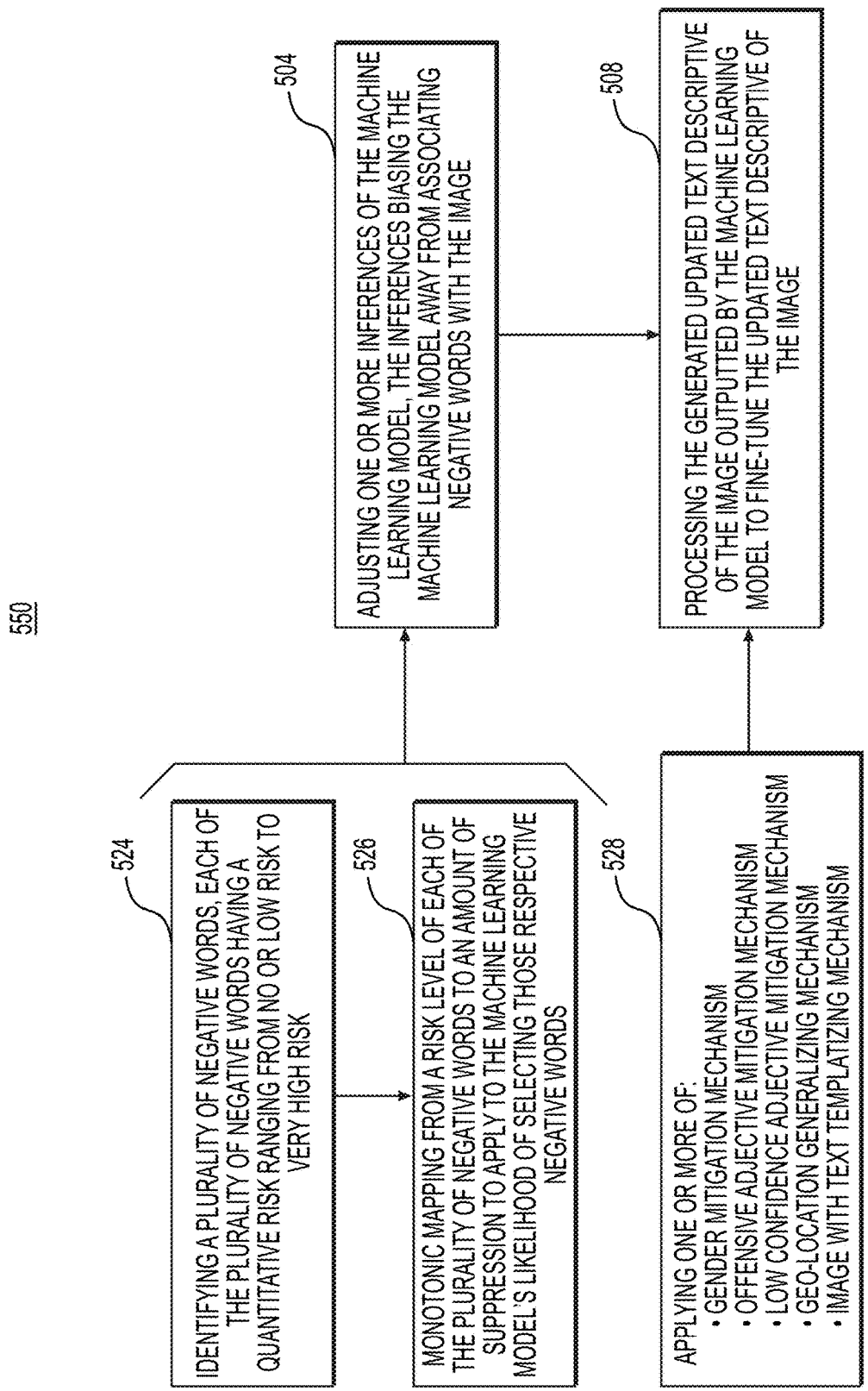
FIG. 6 depicts a flowchart of an exemplary method of substeps for generating text descriptive of digital images using machine learning and post-processing rules, according to some embodiments of the present disclosure.

FIG. 6 depicts a flowchart of an exemplary method of substeps for generating text descriptive of digital images using machine learning and post-processing rules. As shown in FIG. 6, a method 550 comprises adjusting one or more inferences of the machine learning model, the inferences biasing the machine learning model away from associating negative words with the image (Step 504). In one embodiment, as shown in FIG. 6, adjusting one or more inferences of the machine learning model may comprise identifying a plurality of negative words, each of the plurality of negative words having a quantitative risk ranging from no or low risk to very high risk (Step 524); and monotonic mapping from a risk level of each of the plurality of negative words to an amount of suppression to apply to the machine learning model's likelihood of selecting those respective negative words (Step 526).

As shown in FIG. 6, method 550 further comprises processing the generated updated text descriptive of the image outputted by the machine learning model to fine-tine the updated text descriptive of the image (Step 508). In one embodiment, step 508 comprises processing the generated updated text descriptive of the image for fine-tuning the updated text descriptive of the image and is configured to apply one or more of: a gender mitigation mechanism, an offensive adjective mitigation mechanism, a low confidence adjective mitigation mechanism, a geo-location generalizing mechanism; and an image with text templatizing mechanism (Step 528).

Embodiments of the present disclosure comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure gives way to be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure are configurable to also be implemented in cloud computing environments. In this description, "cloud computing" is defined as a model for enabling on-demand network access to a shared pool of configurable computing resources. For example, cloud computing is configurable to be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
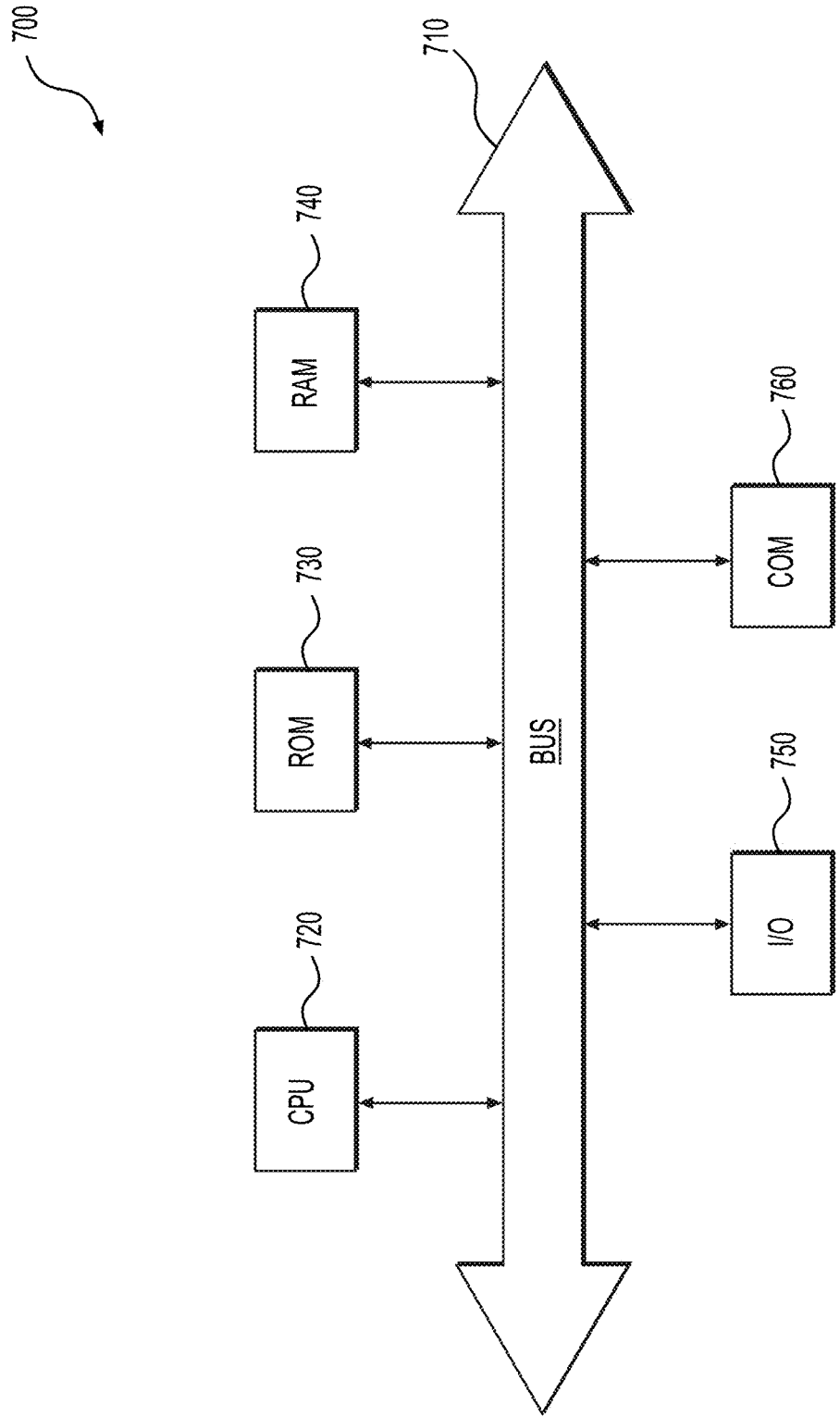
FIG. 7 is a simplified functional block diagram of an exemplary computing device configured to function, according to exemplary embodiments of the present disclosure.

FIG. 7 illustrates, in block diagram form, an exemplary computing device 700 that is configured to perform one or more of the processes described above. One will appreciate that the digital image captioning system 100 can comprise implementations of the computing device 700. As shown by FIG. 7, the computing device generally comprise a processor 720, memory 740, a storage device 730, an I/O interface 750, and a communication interface 760. The computing device 700 generally includes a bus 710. The bus 710 generally comprises hardware, software, or both that couples components of computing device 700 to each other. In certain embodiments, the computing device 700 can include fewer or more components than those shown in FIG. 7. Components of computing device 700 shown in FIG. 7 will now be described in additional detail.

In particular embodiments, processor(s) 720 includes hardware for executing instructions, such as those making up a computer program. As an example, and not by way of limitation, to execute instructions, processor(s) 720 retrieves (or fetches) the instructions from an internal register, an internal cache, memory 740, or a storage device 730 and decode and execute them.

The computing device 700 includes memory 740, which is coupled to the processor(s) 720. The memory 740 may be used for storing data, metadata, and programs for execution by the processor(s). The memory 740 includes one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 740 is configurable to be internal or distributed memory.

The computing device 700 includes a storage device 730 includes storage for storing data or instructions. As an example, and not by way of limitation, storage device 730 can comprise a non-transitory storage medium described above. The storage device 730 includes a hard disk drive (HDD), flash memory, a Universal Serial Bus (USB) drive or a combination of these or other storage devices.

The computing device 700 also includes one or more input or output ("I/O") devices/interfaces 750, which are provided to allow a user to provide input to (such as user strokes), receive output from, and otherwise transfer data to and from the computing device 700. These I/O devices/interfaces 750 include a mouse, keypad or a keyboard, a touch screen, camera, optical scanner, network interface, modem, other known I/O devices or a combination of such I/O devices/interfaces 750. The touch screen is configured to be activated with a stylus or a finger.

The I/O devices/interfaces 750 include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 750 is configured to provide graphical data to a display for presentation to a user. The graphical data may be representative of one or more graphical user interfaces and/or any other graphical content as may serve a particular implementation.

The computing device 700 further includes a communication interface 760. The communication interface 760 is configurable to include hardware, software, or both. The communication interface 760 is configured to provide one or more interfaces for communication (such as, for example, packet-based communication) between the computing device and one or more other computing devices 700 or one or more networks. As an example, and not by way of limitation, communication interface 760 includes a network interface controller (NIC) or network adapter for communicating with an Ethernet or other wire-based network or a wireless NIC (WNIC) or wireless adapter for communicating with a wireless network, such as a WI-FI.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   pre-processing an image, using a machine learning model, to generate an initial text description of the image;
   adjusting inferences of the machine learning model to bias the machine learning model from associating negative words with the image by:
      identifying the negative words and a risk level for each of the negative words in the initial text description of the image; and
      mapping the risk level to a suppression level to reduce a likelihood of the machine learning model selecting the negative words;
   post-processing the image using the machine learning model and the adjusted inferences to generate an updated text description of the image; and
   adjusting the initial text description of the image based on the updated text description of the image.

2. The method of claim 1, further comprising:
   adjusting the inferences of the machine learning model during a beam search of the machine learning model to adjust a posterior probability of selected words of the initial text description of the image; and
   processing the updated text description of the image using pure natural language processing or text-based rules overlaid on part-of-speech (POS) libraries.

3. The method of claim 1, wherein mapping the risk level further comprises multiplying post-softmax likelihoods by a factor inversely proportional to the risk level for each of the negative words in the initial text description of the image.

4. The method of claim 1, wherein adjusting the initial text description of the image comprises applying one or more of:
   a gender mitigation mechanism;
   an offensive adjective mitigation mechanism;
   a low confidence adjective mitigation mechanism;
   a geo-location generalizing mechanism; and
   an image with text templatizing mechanism.

5. The method of claim 4, wherein applying the gender mitigation mechanism further comprises, for each triplet of a gender-triplet-reference collection biasing selection of a gender neutral term over a male version of a word or a female version of a word.

6. The method of claim 1, wherein the initial text description of the image is a title of the image.

7. The method of claim 1, wherein the machine learning model includes a sentence encoder neural network that encodes the initial text description of the image as a vector.

8. The method of claim 7, wherein post-processing the image further includes decoding the vector using a sentence decoder neural network to generate the updated text description of the image.

9. The method of claim 4, wherein the offensive adjective mitigation mechanism detects a noun in the initial text description of the image and infers whether an adjective proceeding the noun is present in a list of offensive adjectives.

10. A method comprising:
    generating, using a first machine learning model, an initial text description of an image to pre-process the image;
    adjusting one or more inferences of the first machine learning model, the inferences biasing the first machine learning model from associating negative words with the image;
    generating an updated text description of the image to post-process the image using a second machine learning model and the adjusted inferences; and
    processing the updated text description of the image to adjust the updated text description of the image by:
       identifying negative words and a risk level for each of the negative words; and
       mapping the risk level to a suppression level to reduce a likelihood of the machine learning model selecting the negative words.

11. The method of claim 10, further comprising:
    adjusting the one or more inferences of the first machine learning model during a beam search of the first machine learning model to adjust a posterior probability of selected words of the text; and
    processing the updated text description of the image using pure natural language processing.

12. The method of claim 10, further comprising multiplying post-softmax likelihoods by a factor inversely proportional to the risk level for each of the negative words.

13. The method of claim 10, wherein processing the updated text description of the image comprises applying one or more of:
    a gender mitigation mechanism;
    an offensive adjective mitigation mechanism;
    a low confidence adjective mitigation mechanism;
    a geo-location generalizing mechanism; and
    an image with text templatizing mechanism.

14. The method of claim 10, wherein applying the gender mitigation mechanism further comprises, for each triplet of a gender-triplet-reference collection biasing selection of a gender neutral term over a male version of a word or a female version of a word.

15. The method of claim 10, wherein the initial text description of the image is a caption of the image.

16. A system comprising:
    a first machine learning model for pre-processing an image to generate an initial text description of the image;
    an inference adjustment module for adjusting inferences of the first machine learning model, the inferences biasing the first machine learning model from associating negative words with the image, including:
       a second machine learning model for identifying negative words and a risk level for each of the negative words and configured for mapping the risk level to a suppression level to reduce a likelihood of the first machine learning model selecting the negative words;

a third machine learning model for post-processing the image using the adjusted inferences to generate an updated text description of the image; and a post-processing module for adjusting the initial text description of the image based on the updated text description of the image.

17. The system of claim 16, wherein:

the inference adjustment module adjusts the inferences of the first machine learning model during a beam search to adjust a posterior probability of selected words of the text; and the third machine learning model post-processes the updated text description of the image using pure natural language processing or text-based rules overlaid on part-of-speech (POS) libraries.

18. The system of claim 16, wherein the second machine learning model is further configured to multiply post-softmax likelihoods by a factor inversely proportional to the risk level for each of the negative words.

19. The system of claim 16, wherein the post-processing module is further configured to apply one or more of:

a gender mitigation mechanism;

an offensive adjective mitigation mechanism;

a low confidence adjective mitigation mechanism;

a geo-location generalizing mechanism; and an image with text templatizing mechanism.

20. The system of claim 16, wherein the initial text description of the image is a title of the image.

* * * * *